United States Patent [19]

Leffler

[11] 4,219,382

[45] Aug. 26, 1980

[54] CATIONIC FORTIFIED ROSIN SIZE

[75] Inventor: Carl T. Leffler, Gretna, La.

[73] Assignee: American Cyanamid Company, Stamford, Conn.

[21] Appl. No.: 659,318

[22] Filed: Feb. 19, 1976

[51] Int. Cl.$^2$ ............................................. D21H 3/34
[52] U.S. Cl. ................................. 162/180; 260/102; 106/218; 106/239
[58] Field of Search ........................ 162/180, 164 EP; 260/101, 102, 24, 105; 106/230, 232, 238, 239, 218

[56] References Cited

U.S. PATENT DOCUMENTS

| | | | |
|---|---|---|---|
| 2,540,776 | 2/1951 | Cadwell | 260/102 |
| 2,772,966 | 12/1956 | Daniel et al. | 162/180 |
| 3,526,524 | 9/1970 | Kulick | 162/180 |
| 3,778,394 | 12/1973 | Lovald et al. | 260/102 |
| 3,966,654 | 6/1976 | Aldrich | 162/180 |

*Primary Examiner*—William F. Smith
*Attorney, Agent, or Firm*—Bruce F. Jacobs; Frank M. Van Riet

[57] ABSTRACT

An acid-fortified rosin is reacted with a water-soluble polyalkylenepolyamine. The product is a modified rosin polyamidopolyamine. The product can be partially or completely neutralized with a rosin, thereby forming a rosin soap of the polyamidopolyamine. The products can be emulsified in water, and are cationic, anionic or non-ionic depending on the pH of the water. The emulsions are sizing agents for paper.

15 Claims, No Drawings

CATIONIC FORTIFIED ROSIN SIZE

BACKGROUND OF THE INVENTION

1. Field of the Invention

The present invention relates to novel cationic rosin polymers useful as sizing agents for paper, to rosin salts of these polymers, to blends of these polymers with other sizing materials, to the foregoing compositions in dry particulate form and as aqueous dispersions, to paper sized by a content of the foregoing compositions, and to the several methods involved.

2. Description of the Prior Art

At the present time, rosin size is the most widely used agent for the manufacture of sized paper. Rosin size is a dispersion of rosin or one or more rosin derivatives in an aqueous medium containing sodium rosinate, and is anionic. It is generally applied by the beater addition process (i.e., it is added to the papermaking fibrous suspension before the fibers have been formed into a web), and the sizing components are deposited on the fibers by the action of alum.

Rosin size has several disadvantages as a sizing agent for paper. One disadvantage is that when it is applied by the beater addition process, as is typical, the resulting paper is acidic because the alum which is used as precipitate is acidic. As a result, paper which is produced by this process generally undergoes acid tendering, which shortens its life. A second disadvantage is that the correct proportioning of the alum and the rosin size is a significant item of technical expense. A third is that sulfate ions (from the alum) continuously build up in the white water system, requiring a portion of the white water to be bled off from the system.

The Daniel et al. U.S. Pat. No. 2,772,966 attempted to overcome these disadvantages by converting rosin to cationic form, so that it would be self-substantive to the fibers, the size being formed by transamidation of ester gum with a water-soluble polyalkylenepolyamine. The resulting size was monomeric, and perhaps for this reason a large amount of the size had to be added to provide even a moderate amount of sizing.

The use of ester gum was necessary as starting material because when rosin and a water-soluble polyalkylenepolyamine are heated together with a water-soluble polyalkylenepolyamine, the rosin forms a salt (i.e., a soap) with the polyalkylenepolyamine but does not form an amide therewith, and so the rosin is not rendered cationic.

SUMMARY OF THE INVENTION

The discovery has now been made that the diacid fortified rosins [the Diels-Alder adducts of rosin with an α,β-unsaturated diacidic material (for example, maleic anhydride or fumaric acid)] rapidly and completely react with water-soluble polyalkylenepolyamines in the normal temperature range (130° C.-200° C.) and that when the two materials are reacted in a molar ratio between about 3:2 and 2:3 the product is a cationic and dispersible modified rosin polyamidopolyamine which is an efficient size. I have further found that when the fortified rosins used are those which are on commercial sale (typically a mixture of diacid fortified rosins with unfortified and therefore monocarboxylic rosins in about 1:10 to 1:1 molar ratio) and when these rosins are used in an amount sufficient to provide 1 mol of diacid fortified rosin per mol of the polyamine, a rosin salt or soap of a polyamidopolyamine such as has been described above forms automatically, that the resulting salt is readily formed into a cationic size by the action of aqueous acid or into an anionic size by the action of aqueous alkali, and that by appropriate use of these sizes, sized paper can be manufactured over the pH range of about 4 to 9 or higher.

I have further found that the above-described rosinyl polyamidopolyamines alone and in rosin salt form dissolve in certain volatile organic liquids and that the resulting solutions can be successfully employed to provide sized paper without use of water.

The invention in its several preferred aspects possesses the following advantages:

1. The diacid fortified rosin-polyalkylenepolyamine condensate can be made in open equipment, and no special controls or uncommon raw materials are needed. The size is stable in an organic solvent solution, an aqueous colloidal dispersion, and a dry particulate state, and so may be shipped and stored in the same manner as ordinary rosin size.

2. The size can be prepared for use without special precautions and provides good results when applied to pulps having an acid or alkaline pH in the range of at least 4-9. The size is thus not pH sensitive and does not require critical pH control.

3. The size is self-substantive to cellulose and other anionic fibers in aqueous suspension at pH values in the range of about 4 to 9, so that it does not require a retention aid. The process thus permits elimination of alum, and results in a cleaner white water. Moreover, it can be used in the manufacture of carbonate-filled papers.

4. The size can be employed both as an internal size and as a surface size with good results in each instance.

5. Paper produced by the process may have an alkaline pH and so need not be subject to acid tendering. The paper is well sized against aqueous alkaline fluids, and thus is suitable for the packaging of materials which cause present-day rosin size to lose its sizing effectiveness.

More in detail, the primary component of the present invention is a cationic polymeric product of a water-soluble polyalkylenepolyamine with an acid-fortified rosin, the molar ratio of the polyalkylenepolyamine component to the acid-fortified rosin being between about 3:2 and 2:3. The product is thus a material composed of polyalkylenepolyamine units containing fortified rosin units attached by amide linkages. The sizes of the present invention are therefore polyamidopolyamines which carry at least one carboxyl group for every rosin unit present and which carry basic amino atoms which are capable of forming salts.

These condensates are cationic, insoluble in water, but are soluble in benzene. Paper dipped in such solutions and dried in the normal range of 190° F.-250° F. is well sized.

These condensates are prepared by heating between about a 3:2 and 2:3 molar ratio mixture of a water-soluble polyalkylenepolyamine (or mixture of such polyamines) and fortified rosin at a temperature in the range of about 125° C. to 200° C. until at least a substantial amount of the polyamidopolyamine forms. I prefer to continue the reaction until between about 1.5 and 2.0 mols of water has evolved per mol of rosin used. If desired, however, when all or part of the rosin is fortified (so that it contains three carboxyl groups per molecule), the reaction can be continued until more water has evolved. In such event the condensation product contains cross-linkages.

The intial rosin-polyalkylenepolyamine condensate, when hot, is a pressure-sensitive adhesive for joining metals and for laying linoleum and asphalt tile. When cold, it can be comminuted in a hammermill to a free-flowing powder which is soluble in benzene and like volatile solvents and in acidulated water.

For the preparation of a condensate suitable for use as a size it is unnecessary to employ a pure fortified rosin. Instead, any of the present day commercial "fortified rosins" can be advantageously employed for the purpose. Such rosins are a mixture of unfortified and fortified rosins, and are prepared by subjecting any of the common monocarboxylic rosins (e.g., tall oil rosin) to a Diels-Alder condensation with a minor amount (1/12 to ½ mol) of an $\alpha,\beta$-ethylenically unsaturated compound of acidic character containing a

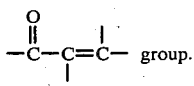

group.

In the polyamine condensation, the fortified component of the mixture may react to the extent of two of its functionalities and can form bridges between the polyalkylenepolyamine molecules. The monocarboxy component of the mixture does not react readily to more than a negligible extent and instead forms a salt with the residual basic nitrogen atoms of the polyamine.

The above-described condensation products possess better sizing properties when they carry a larger proportion of rosin. These condensation products all have basic amino groups, and additional rosin can be introduced by neutralizing some or all of these groups with rosin. If desired, the neutralization can be effected by dissolving the condensation product in benzene or other volatile solvent and then the desired amount of the preferred rosin (or mixture of rosins). The rosin undergoes saponification to the extent that basic nitrogen groups are present, and any excess is present as a blend when the solvent is evaporated. The added rosin can be a natural (i.e., monoacidic) rosin, or it can be one of the "fortified" or polyacidic rosins. Alternatively, it can be substituted partially or wholly replaced by pitch or by a papersizing wax.

The step is performed more easily by employing any of the commercial "fortified" rosins as the starting material for the manufacture of the condensate. These rosins are mixtures of a diacid or polyacid fortified rosin with a natural or monoacid rosin, generally within the molar range of 1/5:1 to ½:1. When such mixtures are used in an amount sufficient to provide one mol of the di- or poly-acid per mol of polyalkylenepolyamine, at amidation temperature, the monoacid rosin does not acylate the polyamine and instead forms a salt with the basic nitrogen atoms to the extent they are present. Any excess monoacid rosin does not react and blends with the product in free acid form. The amount of unreacted acid may be large, such as up to 10 to 20 parts by weight of the condensate.

The aforementioned sizes, before or after salt formation with a rosin, may be reacted with a small amount of a cross-linking agent, for example, diglycidyl ether, 1-3-dichloropropane, and/or epichlorohydrin, to increase the average molecular weight of the condensation product. The efficiency of the sizes increases as their molecular weight increases. The amount of cross-linking agent should be minor, in the range of about 1/10 to ⅓ mol per mol of basic amino nitrogen atoms present, so as to avoid formation of an insoluble three-dimensional polymer. The cross-linking agent should be reacted completely (i.e., reacted as to both its functionalities) so as to avoid a product which will increase in viscosity on storage, and so as to consume substantially all of the agent for its intended purpose. Epichlorohydrin can be reacted substantially completely when added in small amount, and is therefore preferred. Glyoxal or formaldehyde can also be used.

The initial polyamine rosin condensation product when molten is a pressure-sensitive adhesive. When cold it is friable and can be ground to a coarse powder. The particles dissolve readily in benzene; the resulting solution is an anhydrous size for paper which can be applied by impregnation.

The condensation product can be emulsified in water (particularly when softened by addition of benzene). When the emulsification is performed at an acidic pH a dispersing agent is needed. The resulting emulsion is best homogenized, after which the solvent may be stripped off. The emulsified particles are cationic and are self-substantive to cellulose fibers in aqueous suspension.

When the condensation product is emulsified in neutral or mildly alkaline water, the resulting dispersion is substantially non-ionic and is best applied by size press.

When a sufficient proportion of the basic amino groups are neutralized by a rosin, the product is substantially non-ionic when emulsified in acidulated water, but is substantially self-emulsifying when rapidly agitated in water containing a base (potassium or sodium hydroxide or carbonate or other strong base); the base saponifies the unreacted rosin present and converts it into an emulsifying agent for the condensation product. The resulting emulsion is a paste rosin size which is used in the same manner as ordinary rosin size.

Sized paper is manufactured by adding the foregoing cationic dispersion (preferably diluted to 1%-10% solids to facilitate metering and distribution) to a papermaking pulp, preferably as close to the wire as practicable. When the pulp has an acid pH, the polymer (together with the rosin which it carries in salt form) is rapidly and substantively adsorbed by the fibers, and no alum or other precipitating agent is needed. I have found that similar adsorption occurs on the alkaline side, up to at least pH 8.

The polyalkylenepolyamines employed in the present invention are a well-known class of compounds, preferred members known being the commercially available and readily prepared diethylenetriamine, triethylenetetramine, tetraethylenepentamine, corresponding polypropylenepolyamines and polybutylenepolyamines, and analogues thereof. These compounds have the generic formula $H_2N(C_mH_{2m}NY)_pC_mH_{2m}NH_2$ wherein Y represents H or $-C_mH_{2m}NH_2$, m is a whole integer between 2 and 4 inclusive, and p is an integer between 1 and 4. Their chain length is not important in terms of results as the high molecular alkyleneimines such as poly(ethylenimine) may also be used, as well as the high molecular amines formed by reacting simple polyalkylenepolyamines such as diethylenetriamine or 3,3'-iminobispropylamine with about 1 mol respectively of 1,3-dichloropropane or 1,2-dichloroethane. All these and similar polyalkylenepolyamines are water-soluble and basic and are suitable for the practice of the present invention.

If desired, ethylenediamine can be employed along with the polyalkylenepolyamines to decrease the cationicity of the product.

The fortified rosins which are referred to above are the Diels-Alder condensation products of any of the naturally-occurring rosins (including disproportionated rosin and formaldehyde-reacted rosin with an $\alpha,\beta$-unsaturated dicarboxylic acids or anhydrides. These form a recognized class, cf. U.S. Pat. Nos. 2,383,933; 2,628,918; 2,957,777; 2,684,300; 2,771,464; which are incorporated herein by reference. The starting rosins can be natural gum, wood or talloil rosin, or such rosins which have been disproportionated, or reacted with phenolic resins or with formaldehyde. They are thus any of the foregoing rosins which have been subjected to a Diels-Alder condensation with such monocarboxylic acid materials as acrylic acid, methacrylic acid, monoethylfumarate and maleamic acid, or with such dicarboxylic acidic materials as fumaric acid, maleic anhydride, acetylenedicarboxylic acid, citraconic anhydride, dehydrated citric acid, itaconic acid and the like, reacted in the range of 1/5 to ½ mol of the unsaturated acid per mol of rosin, so that the molar ratio of uncondensed to condensed rosin in the product is between about 4:1 and 1:1.

The sizes of the present invention can be applied in conjunction with many of the other materials now commercially employed by the paper manufacturer. Thus they may be added to pulps which contain clay, calcium carbonate, barytes, titanium dioxide, ultramarine, phthalocyanine, and carbon black as fillers, pigments and colorants; starches, gums and glues as natural strengthening agents; the thermosetting melamine-formaldehyde acid colloid of U.S. Pat. No. 2,345,543 as wet strengthening agent; and the cationic water-soluble glyoxalated polyacrylamide of U.S. Pat. No. 3,556,932.

The unusually good sizing properties possessed by the paper of the present invention are ascribable primarily to the fact that the herein-described condensation product of acid-fortified rosin with a water-soluble polyalkylenepolyamine is water-insoluble and is not removed by the action of dilute acids or bases.

The pulps which can be successfully sized by the condensation products of the present invention are any of the common anionic fibers which are currently used in papermaking. These include polyacrylonitrile fibers, glass fibers, and asbestos fibers, in addition to cellulose fibers.

The invention is further illustrated by the examples which follow. These examples are the preferred embodiments of the invention, and the invention is not to be construed as limited thereto.

DESCRIPTION OF THE PREFERRED EMBODIMENTS

EXAMPLE 1

The following illustrates the preparation of a rosin salt of a cationic polymeric condensate of a water-soluble polyalkylenepolyamine and a Diels-Alder adduct of a monocarboxy rosin with fumaric acid.

A mixture of 311 g. (1 mol) of talloil rosin having a reacted content of 3% by weight of formaldehyde and 209 g. (0.6 mol) of a 41.5 mol percent fumarated talloil rosin is heated to 185° C., and 36.5 g. (0.25 mol) of triethylenetetramine is added. The temperature is maintained at 185° C. for one hour during which time the viscosity of the reaction mixture increases and a mixture of 2.14 g. (0.12 mol) of water and 0.36 g. of a volatile titratable base are collected as distillate. The product is reddish and clear, and comprises a rosin soap of a polyamidopolyamine composed of intercondensed fumarated talloil rosin and triethylenetetramine in about 1:1 molar ratio.

EXAMPLE 2

The following illustrates the recovery of a polyalkylenepolyamine-acid fortified rosin condensate in substantially pure form, and certain of its uses.

To 300 g. of a 40% mol fumarated talloil rosin is added 189 g. of tetraethylenepentamine, and the mixture is heated at 185° C. until evolution of water has substantially ceased (about 1 hour). To the reaction product at 100° C. is added with stirring 1,000 cc. of water containing 34 g. (0.6 mol) of KOH. The unamidated monocarboxylic resin present is saponified, and a brown resinous polyamidopolyamine is left.

The polyamidopolyamine is a pressure-sensitive adhesive for cementing linoleum and tile to wood.

Paper impregnated with a 1% solution of the polyamidopolyamine in benzene and then dried is well sized, particularly against cream, alkaline fluids, and blood.

EXAMPLE 3

The following illustrates the preparation of a cationic polymeric size according to the present invention in free flowing particulate form.

100 g. of the product of Example 1 at room temperature is crushed in a mortar with a pestle. The product is a coarse amber powder resembling unrefined granulated sugar. The product is free-flowing and remains free-flowing when stored 1 week at 36° C., and readily disperses in water.

EXAMPLE 4

The following illustrates the preparation of a paste cationic size of the polymeric condensate of the present invention.

To 100 g. of water at 70° C. adjusted to pH 4 with hydrochloric acid is added 30 g. of the powder product of Example 3. The powder disperses rapidly forming a viscous pasty mass, which is a paste size. The size is diluted readily with water to 1% solids and adjusted to pH 4 with hydrochloric acid. The dispersion is stable for at least a week.

The 1% dilute material gives good sizing when added to an aqueous suspension of cellulose papermaking fibers at pH 4.5 which contains no alum or other precipitating agent.

EXAMPLE 5

The following illustrates the preparation of a cationic polyamidopolyamine according to the present invention containing substantially no rosin or Diels-Alder rosin adduct in other than amidated state.

To 325 g. of the Diels-Alder reaction product of 302 g. of talloil rosin (1 mol) with 24.5 g. (¼ mol) of maleic anhydride is added 47.3 g. of tetraethylenepentamine (¼ mol). The mixture is heated to 225° C. until evolution of water substantially stops. The reaction mixture is cooled to 95° C. and to this is added 200 cc. of water containing 10 g. of sodium hydroxide and 15 g. of sodium bicarbonate to maintain the liquid moderately alkaline. A soap of the unamidated rosin and maleated rosin forms. The aqueous soap is filtered off, leaving the insoluble polymeric rosinated polyalkylenepolyamine.

The insoluble product is washed with alkaline water, heated to melting and cooled. It is a brown glassy solid.

EXAMPLE 6

To 100 cc. of toluene is added 0.3 g. of the product of Example 5 which dissolves. A sheet of paper is dipped in the solution, and removed and allowed to dry. It is well sized to 20% aqueous lactic acid solution.

EXAMPLE 7

The following illustrates the preparation of a paste anionic size according to the present invention.

To 100 cc. of 10% aqueous sodium hydroxide at 70° C. is added 30 g. of the powder product of Example 3. The powder dissolves rapidly forming a viscous pasty mass, which is a paste size. The size dissolves readily in water to 1% solids. The solution is stable for at least a week.

The 1% solution gives good sizing when added to an aqueous cellulose suspension of cellulose papermaking fibers containing 1.5% of alum based on the dry weight of the fibers.

EXAMPLE 8

The following illustrates the intrinsic sizing properties of a polymer condensate of the present invention.

A ½% solution of the product of Example 1 in benzene is prepared. A sheet of filter paper (waterleaf paper) is dipped in the solution and allowed to air dry. The paper is well sized against water, ink, and dilute lactic acid. Sizing improves when the paper is pressed against a hot plate at about 200° F. for about 20 seconds.

The benzene solution is stable for at least a month.

Similar results are obtained when the procedure is repeated with toluene in place of benzene.

EXAMPLE 9

The following illustrates the preparation of an aqueous colloidal cationic dispersion of the cationic rosin product of Example 1.

To 100 g. of the cationic rosin of Example 1 in crushed state is added 100 g. of toluene as softening agent for the cationic rosin. The rosin dissolves completely in the toluene at room temperature. To this is added a solution of 9.75 g. (0.096 mol) of acetic acid in 200 g. of water. The mixture is stirred with a spatula forming a crude primary emulsion which is passed twice through a laboratory homogenizer at a minimum pressure of 3,500 lb./in.$^2$, after which the toluene is stripped off under vacuum. The product is a white creamy colloidal dispersion of the cationic rosin having a particle size less than 1 micron. The dispersion is stable for at least a month and contains about 35% solids by weight. It remains stable for at least a month when diluted to 1% solids content with water.

EXAMPLE 10

The following illustrates the preparation of a cationic rosin emulsion according to the present invention without use of a softening agent for the rosin.

Into a laboratory autoclave are placed 250 g. of a cationic rosin powder prepared according to Example 3. To this is added 500 g. of water containing 15 g. (0.15 mol) of acetic acid. The autoclave is sealed, heated to 130° C., and the contents stirred at maximum speed for 30 minutes, allowed to cool, and opened. The product is a crude emulsion which is passed twice through a pressurized laboratory homogenizer at a temperature of 150° C. and a pressure of 4,000 lb./in.$^2$. A creamy dispersion is obtained.

EXAMPLE 11

The following illustrates the manufacture of a paste anionic rosin size according to the present invention.

A mixture of 302 g. of pale talloil rosin (1 mol) and 45.5 g. (0.146 mol) of a 73.5 mol percent maleated talloil rosin is heated to 150° C. and 46.5 g. (0.319 mol) of triethylenetetramine are added. The mixture is maintained at 150° C. for 1.5 hours, after which 75.0 g. of the resulting cationic rosin is poured into a flask and allowed to cool to 106° C. To this is slowly added with stirring 32 g. of water containing 1.52 g. of sodium hydroxide. The product is a paste anionic rosin size of 70% solids which is readily dispersed in hot or cold water.

EXAMPLE 12

The following illustrates the manufacture of a different paste anionic rosin size according to the present invention by conversion of a cationic size to the anionic state.

To a 75-g. portion of the cationic rosin product of Example 3 at 106° C. is slowly added with moderate agitation 30.3 g. of water containing 5.2 g. (0.105 mol) of sodium hydroxide. The temperature of the mixture is maintained at 100° C.–105° C. The product is an unusually fluid reddish anionic paste rosin size which is readily dilutable with water to 1% solids.

EXAMPLE 13

The following illustrates the comparative effectiveness of a typical cationic rosin size emulsion and a paste rosin size, according to the present invention.

A. An aliquot is removed from a stock laboratory aqueous dispersion of a neutral 50:50 mixture of bleached softwood Kraft:bleached hardwood Kraft fibers beaten to a Canadian Standard Freeness of 400 ml. and having a consistency of 0.6%. A sample of the colloidal cationic sizing dispersion of Example 9 is diluted to 2.5% of cationic rosin based on the dry weight of the fibers. The sample is gently stirred for a few moments to distribute the size among the fibers, after which the pH of the resulting fibrous suspension is adjusted to pH 4.6 by addition of 0.5% of alum based on the dry weight of the fibers and hydrochloric acid.

The fibers are then formed into a sheet by standard laboratory method, having a basis weight of 50 lb. (40″×25″/500 ream), which is dried on a laboratory drum drier having a surface temperature of 240° F. The resulting paper is strongly resistant to penetration by water, by ink, and by 20% aqueous lactic acid solution.

B. The procedure is repeated, except that the paste cationic rosin size of Example 4 is employed in place of the cationic rosin dispersion.

Results are as follows.

| Cationic Rosin Size Added | | %[a] Alum Added | pH[b] | Sizing, Ink[c] (Sec.)[d] |
|---|---|---|---|---|
| Type | %[a] | | | |
| Dispersion | 0.3 | 0.3 | 4.6 | <1 |
| " | 0.5 | 0.5 | 4.6 | 325 |
| Paste | 0.3 | 0.3 | 4.6 | 47 |

| Cationic Rosin Size Added | | %[a] Alum Added | pH[b] | Sizing, Ink[c] (Sec.)[d] |
|---|---|---|---|---|
| Type | %[a] | | | |
| " | 0.5 | 0.5 | 4.6 | 378 |

[a]Based on dry weight of fibers.
[b]After addition of size.
[c]TAPPI standard.
[d]By optical ink penetration test. Seconds for pool of ink to decrease by 20% reflectance of bottom of sheet of paper mounted horizontally.

EXAMPLE 14

The following illustrates the manufacture of paper at about neutral pH, with considerable decrease in the amount of alum consumed.

The process of Example 13 is repeated except that the amount of alum is decreased by half (to 0.25%); 0.1% (based on the dry weight of the fibers) of a water-soluble cationic fully reacted 1:1:0.3 molar ratio adipic acid:diethylenetriamine:epichlorohydrin condensate (described in Strazdins U.S. Pat. No. 3,329,657) is added as replacement therefor, and the pH of the suspension, after addition of the sizing suspension, is adjusted to 6.8. Paper of substantially the same sizing properties is obtained.

EXAMPLE 15

The following illustrates the preparation of a cationic rosin dispersion according to the present invention wherein epichlorohydrin is employed as supplementary polymerizing agent.

To a mixture of 311 g. (1 mol) of a tall oil rosin containing 3% by weight of reacted formaldehyde and 209 g. (0.6 mol) of a talloil rosin fortified by a reacted content of 41.5 mol percent of fumaric acid, heated to 180° C., is added 27 g. (0.374 mol) of acrylic acid. The temperature is maintained for two hours. The acrylic acid combines with the unfortified rosin according to the Diels-Alder reaction forming a monoacid fortified rosin. There is then added 43.6 g. (0.293 mol) of triethylenetetramine, and the temperature of 180° C. is maintained for an additional five hours. The mixture is then allowed to cool to 150° C. and 10.7 g. (0.116 mol) of epichlorohydrin is added slowly, over five hours. The reaction mixture is maintained at 150° C. for two hours after addition of the last increment of epichlorohydrin, at which time the reaction mixture is a viscous, dark, resinous cationic rosin. The rosin is poured upon a tray, allowed to cool to room temperature, and broken into small pieces. To 100 g. of this material dissolved in 100 g. of benzene is added with manual stirring 9.75 g. (0.096 mol) of glacial acetic acid dissolved in 200 cc. of water. A crude emulsion forms which is passed twice through a homogenizer at a minimum pressure of 3,500 lb./in.$^2$. The benzene is stripped off under vacuum. The product is a white colloidal cationic rosin size emulsion containing 35% solids by weight.

EXAMPLE 16

The following illustrates a different method for preparation of a cationic rosin size according to the present invention.

A mixture of 311 g. (1 mol) of a 3% by weight formaldehyde tall oil rosin and 211 g. (0.698 mol) of a 56 mol percent maleated tall oil rosin is heated to 150° C. and 76.8 g. (0.526 mol) of triethylenetetramine is added. The reaction mixture thickens noticeably. After one hour 19.3 g. (0.209 mol) of epichlorohydrin is added and the reaction temperature is decreased to 130° C. The reaction mixture is maintained at that temperature for 45 minutes and then cooled and broken up into lumps. To a solution of 100 g. of the product in 100 g. of benzene is added 9.76 g. of acetic acid (0.906 mol) in 100 g. of water with manual stirring. A crude emulsion forms. The emulsion is passed twice through a laboratory homogenizer under a minimum pressure of 3,500 lb./in.$^2$, after which the benzene is stripped off. The product is a white aqueous colloidal emulsion containing 35% by weight of cationic rosin size particles. The emulsion is stable both as prepared and when diluted to 1% solids content with water.

EXAMPLE 17

The following illustrates the preparation of a dry free-flowing particulate composition comprising a polyamidepolyamine according to the present invention, starting with an aqueous colloidal dispersion of the composition.

To the creamy dispersion product of Example 9 is added 45 g. of glacial acetic acid (an excess). The water is removed by azeotropic distillation with toluene, which also removes the excess acetic acid. The product is cooled and pulverized. The resulting coarse free-flowing powder disperses readily in hot water.

EXAMPLE 18

The procedure of Example 16 is repeated except that the temperature of 150° C. is maintained for one hour after addition of the epichlorohydrin, and the amount of acetic acid added is decreased to 7.65 g. (0.075 mol). A similar product is obtained.

EXAMPLE 19

The following illustrates the preparation of a paste cationic size according to the present invention in dry particulate free flowing form.

To 100 g. of a reddish clear polyamidopolyamine prepared by the method of Example 1 at 100° C. is slowly added with stirring 50% aqueous potassium hydroxide solution until 30% of the free rosin present is saponified. The resulting solution is clear and contains 70% solids by weight. The solution is dried in the form of thin friable flakes on a laboratory drum drier. The flakes dissolve readily in water regenerating the size. The size is stable as prepared and when diluted to 1% solids with water.

I claim:

1. A cationic modified rosin polyamidopolyamine condensation product formed at a temperature of about 130° C.–200° C. from a water-soluble polyalkylenepolyamine having the generic formula $H_2N(C_mH_{2m}NY)_pC_mH_{2m}NH_2$ where Y represents H or $-C_mH_{2m}NH$, m is a whole integer between 2 and 4 inclusive, and p is an integer between 1 and 4, and an acid-fortified rosin being the Diels-Alder condensation product from a naturally occurring rosin and a α,β-ethylenically unsaturated compound of acidic character containing a

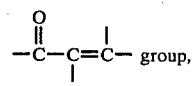

group, the molar ratio of said polyalklyenepolyamine to said acid-fortified rosin being between about 3:2 and 2:3.

2. A condensation product according to claim 1 wherein the polyalkylenepolyamine is triethylenetetramine.

3. A condensation product according to claim 1 wherein the acid-fortified rosin is fumarated rosin.

4. A reaction product of a condensation product according to claim 1 with 1/10 to ¼ mol of epichlorohydrin per mol of basic amino nitrogen atoms in said condensation product.

5. A rosin salt of a condensation product according to claim 1, formed when said naturally occurring rosin contains a diacid or polyacid fortified rosin where the molar range of said di- or poly- acid fortified rosin to said naturally occurring resin is about 0.2:1 to 0.5:1 such that, at amidation temperature, the number of mols of rosin forming said salt being substantially equal to the number of cationic nitrogen atoms in said condensation product.

6. A rosin salt according to claim 5 in dry, free flowing particulate form.

7. A condensation product of a salt according to claim 5 formed by reacting between about 1/10 mol and ¼ mol of epichlorohydrin with about 1 mol of basic amino nitrogen atoms in said condensate.

8. An acidic colloidal dispersion of a rosin salt according to claim 5 formed when the excess of said naturally occurring rosin blends with said condensation product in free acid form.

9. An aqueous alkaline colloidal dispersion of a cationic polymeric condensation product of a water-soluble polyalkylenepolyamine with an acid-fortified rosin according to claim 1 formed when an alkaline solution containing said condensation product is agitated, such that the unreacted rosin present is saponified and converted into an emulsifying agent.

10. A process for making a condensation product according to claim 1, which comprises heating a mixture of one mol of a water-soluble polyalkylenepolyamine and about one mol of an acid-fortified rosin at a temperature between 125° C. and 200° C. until at least ¾ of said rosin has condensed with said polyalkylenepolyamine.

11. A process for the manufacture of cationic paste rosin size which comprises dispersing a composition according to claim 1 in aqueous acid.

12. A process for the manufacture of cationic paste rosin size which comprises dissolving a composition according to claim 1 in sufficient of an aromatic solvent therefor to form a pourable syrup, emulsifying said syrup in water having a pH not in excess of 7, and stripping off said solvent.

13. A process for the manufacture of an anionic paste rosin size which comprises dispersing a rosin salt according to claim 5 in aqueous alkali.

14. Paper sized by a content of a condensation product according to claim 1.

15. Paper sized by a content of a salt according to claim 5.

* * * * *